(12) United States Patent
Wieres

(10) Patent No.: US 6,334,981 B1
(45) Date of Patent: *Jan. 1, 2002

(54) DOUBLE-WALLED HOUSING, IN PARTICULAR FOR EXHAUST GAS CATALYTIC CONVERTERS OF MOTOR VEHICLES AND METHOD OF PRODUCING A DOUBLE-WALLED HOUSING

(75) Inventor: Ludwig Wieres, Overath (DE)

(73) Assignee: EMITEC Gesellschaft Für Emissionstechnologies mbH, Lohmar (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,594

(22) Filed: Jun. 20, 1997

Related U.S. Application Data

(62) Division of application No. PCT/EP95/04585, filed on Nov. 21, 1995.

(30) Foreign Application Priority Data

Dec. 20, 1994 (DE) .......................................... 44 45 557

(51) Int. Cl.[7] ............................ F01N 3/28; B01D 53/34
(52) U.S. Cl. ........................ 422/177; 422/171; 422/180
(58) Field of Search ................................. 422/168–180; 60/299–300; 55/DIG. 30; 29/890

(56) References Cited

U.S. PATENT DOCUMENTS

| 4,343,074 | A | * | 8/1982 | Bailey et al. | ................ | 422/179 |
|---|---|---|---|---|---|---|
| 4,519,120 | A | * | 5/1985 | Nonnenmann et al. | ...... | 422/179 |
| 5,094,072 | A | * | 3/1992 | Ampferer et al. | ........... | 422/180 |
| 5,150,573 | A | * | 9/1992 | Maus et al. | .................. | 422/171 |
| 5,173,267 | A | * | 12/1992 | Maus et al. | .................. | 422/179 |
| 5,180,408 | A | * | 1/1993 | Worner et al. | ............... | 422/177 |
| 5,293,743 | A | * | 3/1994 | Usleman et al. | ............ | 422/179 |
| 5,366,700 | A | * | 11/1994 | Humpolik et al. | ........... | 422/180 |

\* cited by examiner

*Primary Examiner*—Hien Tran
(74) *Attorney, Agent, or Firm*—Herbert L. Lerner; Laurence A. Greenberg; Werner H. Stemer

(57) ABSTRACT

A double-walled housing, in particular for exhaust gas catalytic converters of motor vehicles, includes an inner jacket and an outer jacket approximately concentrically surrounding and spaced apart from the inner jacket. The inner and outer jackets rest tightly against one another at both end surfaces. The inner jacket is kept under compressive strain at least at two end regions by constrictions of the outer jacket. The outer jacket has embossed features oriented toward the inner jacket. The housing is produced by deforming the inner jacket by rolling a metal sheet into cylindrical or conical form while maintaining a parting line. The outer jacket is deformed by rolling a metal sheet into cylindrical or conical form and by connecting mutually meeting edges by a joining technique. The inner jacket is disposed in the outer jacket and the outer jacket is plastically deformed inward over its entire circumference on both end surfaces in such a way that the inner jacket is kept under compressive strain. The outer jacket is provided beforehand or simultaneously with embossed features oriented toward the inner jacket.

23 Claims, 2 Drawing Sheets

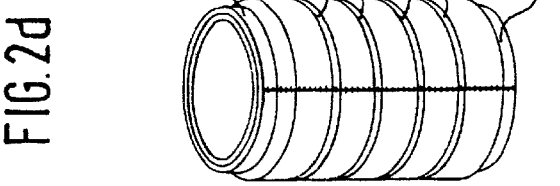
FIG.2a
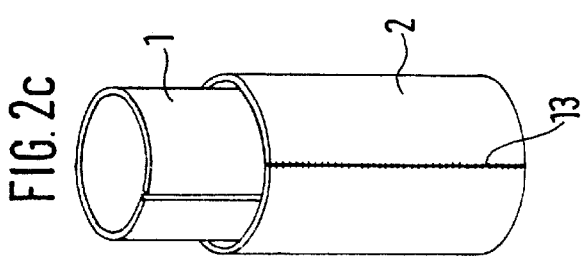
FIG.2b  FIG.2c  FIG.2d
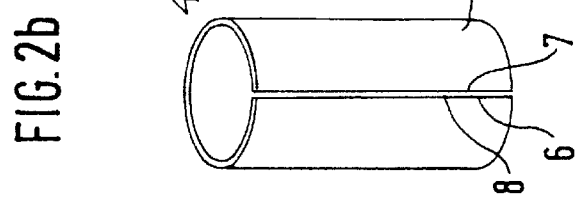
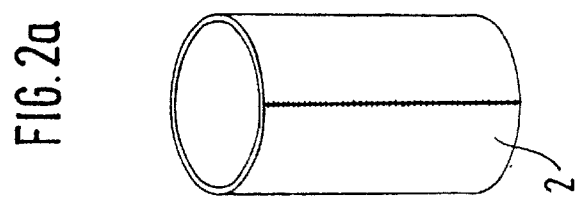
FIG.1
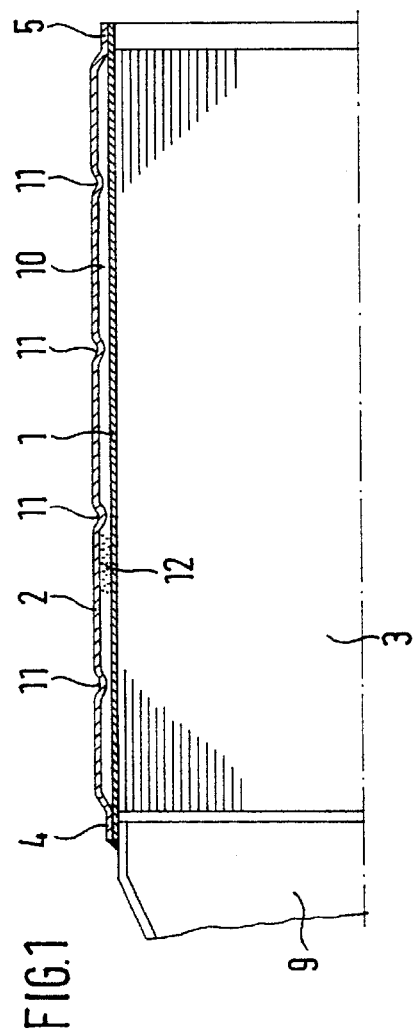

DOUBLE-WALLED HOUSING, IN PARTICULAR FOR EXHAUST GAS CATALYTIC CONVERTERS OF MOTOR VEHICLES AND METHOD OF PRODUCING A DOUBLE-WALLED HOUSING

CROSS REFERENCE TO RELATED APPLICATION

This application is a continuation of International Application Serial No. PCT/EP95/04585, filed Nov. 21, 1995.

BACKGROUND OF THE INVENTION

1. Field of the Invention

The present invention relates to a double-walled housing, particularly for exhaust catalytic converters of motor vehicles which include a metal catalyst carrier through which exhaust gas can flow. The present invention also relates to a method for producing a double-walled housing.

Many forms of catalyst carriers are known. One example of a metal catalyst carrier can be learned from Published European Patent Application 0 245 737 A1, corresponding to U.S. Pat. No. 4,832,998. That catalytic converter body can, for example, be built up from metal sheets or produced by powder metallurgy.

Such catalyst carriers are disposed in a housing. Due to the mechanical strains in such a body that arise from alternating thermal stresses, proposals have already been made for how such strains might be reduced by suitably shaping or especially constructing the sheathing.

European Patent 0 435 956 B, corresponding to U.S. Pat. Nos. 5,173,267 and 5,190,732, discloses a double-walled housing for exhaust catalytic converters, especially for motor vehicles. The honeycomb-like catalyst carrier is supported by an inner jacket tube that is disposed in an outer jacket tube. The inner jacket tube is disposed in such a way as to be longitudinally expandable in the outer jacket tube. The free longitudinal expandability is attained through the use of a sliding fit.

German Utility Model DE 74 01 002 U discloses a housing for a catalyst carrier body that has an inner jacket and an outer jacket. That housing serves to receive a ceramic catalyst carrier. A compressible porous damping layer is disposed between the inner jacket and the catalyst carrier.

In order to meet ever more stringent environmental laws, the cold starting and restarting properties of exhaust gas catalytic converters are becoming increasingly more important. The thermal insulation properties of housings play an important role in those properties, so that improvements are sought while maintaining the same economy of manufacture.

SUMMARY OF THE INVENTION

It is accordingly an object of the invention to provide a double-walled housing, in particular a sheathing for exhaust gas catalytic converters of motor vehicles, and a method of producing a double-walled housing, which overcome the hereinafore-mentioned disadvantages of the heretofore-known devices and methods of this general type, which can be manufactured simply and economically and which has great stability and favorable thermal insulation properties. The housing should also be suitable for other portions, for instance conical portions, of an exhaust system, particularly with a view to its thermal insulation properties.

With the foregoing and other objects in view there is provided, in accordance with the invention, a double-walled housing, in particular for exhaust gas catalytic converters of motor vehicles, comprising an inner jacket having two end regions; an outer jacket approximately concentrically surrounding the inner jacket at a spacing, the outer jacket having constrictions keeping the inner jacket under compressive strain at least at the two end regions, and the outer jacket having embossed features oriented toward the inner jacket; and the inner jacket and the outer jacket having end surfaces resting tightly against one another.

In accordance with another feature of the invention, the embossed features are distributed approximately uniformly over the length of the housing and the circumference, in order to attain uniform mechanical stability.

The jackets may be formed of metal sheets having a total wall thickness which is less than the thickness of the single housing wall known previously. In order to obtain adequately great stability of the housing, the outer jacket is provided with embossed features pointing toward the inner jacket that are preferably formed symmetrically on the outer jacket. These embossed features are preferably constructed in such a way that they lend the housing great stability in both a radial and a tangential direction. In this way and because of the interstice formed between the two jackets that acts as a thermal insulation, the inner jacket tube can heat up faster with the catalyst carrier and overall can reach a higher temperature than without the outer jacket. The thermal stresses in the interior of the catalyst carrier are reduced due to this property. Moreover, the inner jacket is not exposed to any external influences, so that there is a wider spectrum of materials from which a choice can be made. The inner jacket can also be reduced in terms of its wall thickness due to these properties of the housing.

In accordance with a further feature of the invention, the thermal insulation properties of the housing can also be purposefully adjusted by provided that some of the embossed features in the outer jacket touch the inner jacket, or that additional insulating layers or coatings are provided on or between the two jackets. Besides heat conduction, which is best reduced through the use of a gap between the two jackets, convection, which is best prevented by a ceramic intermediate layer, plays a role. However, another factor that is important at higher temperature is heat radiation, which can be reduced or reflected through the use of suitable coatings. The housing according to the invention offers the possibility of purposefully adapting these properties to demands made of them, especially in catalytic converters. As a result, the cold-starting and re-starting properties of such a catalytic converter can be improved.

In accordance with an added feature of the invention, the outer jacket tube includes a round or conically shaped, preferably rolled, metal sheet, and the abutting edges are joined together by joining techniques. The term "round-rolled" is understood to mean other than round-cross-sectional forms as well and may, for instance, involve oval or elliptical forms.

In accordance with an additional feature of the invention, the inner jacket includes a round-rolled metal sheet, with a parting line extending over the entire length of the jacket. This feature has the advantage of simplifying manufacture, because the inner jacket, as viewed in its circumferential direction, is not closed and therefore one less seam needs to be made.

In accordance another feature of the invention, the joining seam is a laser-welded seam.

In accordance with yet another feature of the invention, the inner jacket and the outer jacket, respectively, have a wall thickness of from 0.3 to 1 mm.

In accordance with a further feature of the invention, the inner jacket and the outer jacket have a maximum spacing therebetween of approximately 0.3 to 4 mm and preferably a maximum spacing of approximately 0.5 to 1 mm.

With the objects of the invention in view there is also provided a method for producing a double-walled housing, in particular for exhaust gas catalytic converters of motor vehicles, which comprises forming an inner jacket by deforming, preferably rolling, a metal sheet into cylindrical or conical form while maintaining a parting line; forming an outer jacket by deforming, preferably rolling, a metal sheet into cylindrical or conical form and connecting mutually meeting edges of the metal sheet by a joining technique; placing the inner jacket approximately concentrically in the outer jacket at a spacing with the inner jacket and the outer jacket resting tightly against one another on two end surfaces; plastically deforming the outer jacket inwardly on both end surfaces over its entire circumference for keeping the inner jacket under compressive strain; and providing the outer jacket with embossed features oriented toward the inner jacket beforehand or simultaneously with the deforming step.

In accordance with another mode of the invention, an insulating layer is placed between the inner jacket and the outer jacket prior to the deformation of the outer jacket.

In accordance with a further mode of the invention, the inner jacket tube is also provided on its outer surface and/or the outer jacket tube is provided on its inner surface with a coating, for instance an oxide film, that influences radiation properties.

In accordance with a concomitant feature of the invention, in a subsequent installation, the end surfaces of the inner jacket tube and the outer jacket tube are welded together before or during joining to an adjacent part.

Other features which are considered as characteristic for the invention are set forth in the appended claims.

Although the invention is illustrated and described herein as embodied in a double-walled housing, in particular for exhaust gas catalytic converters of motor vehicles, and a method of producing a double-walled housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, longitudinal-sectional view of an exhaust gas catalytic converter with a double-walled housing according to the invention; and FIGS. 2a–2d are reduced, perspective views illustrating a course of production of such a housing.

DESCRIPTION OF THE PREFERRED EMBODIMENTS

Figure 3:
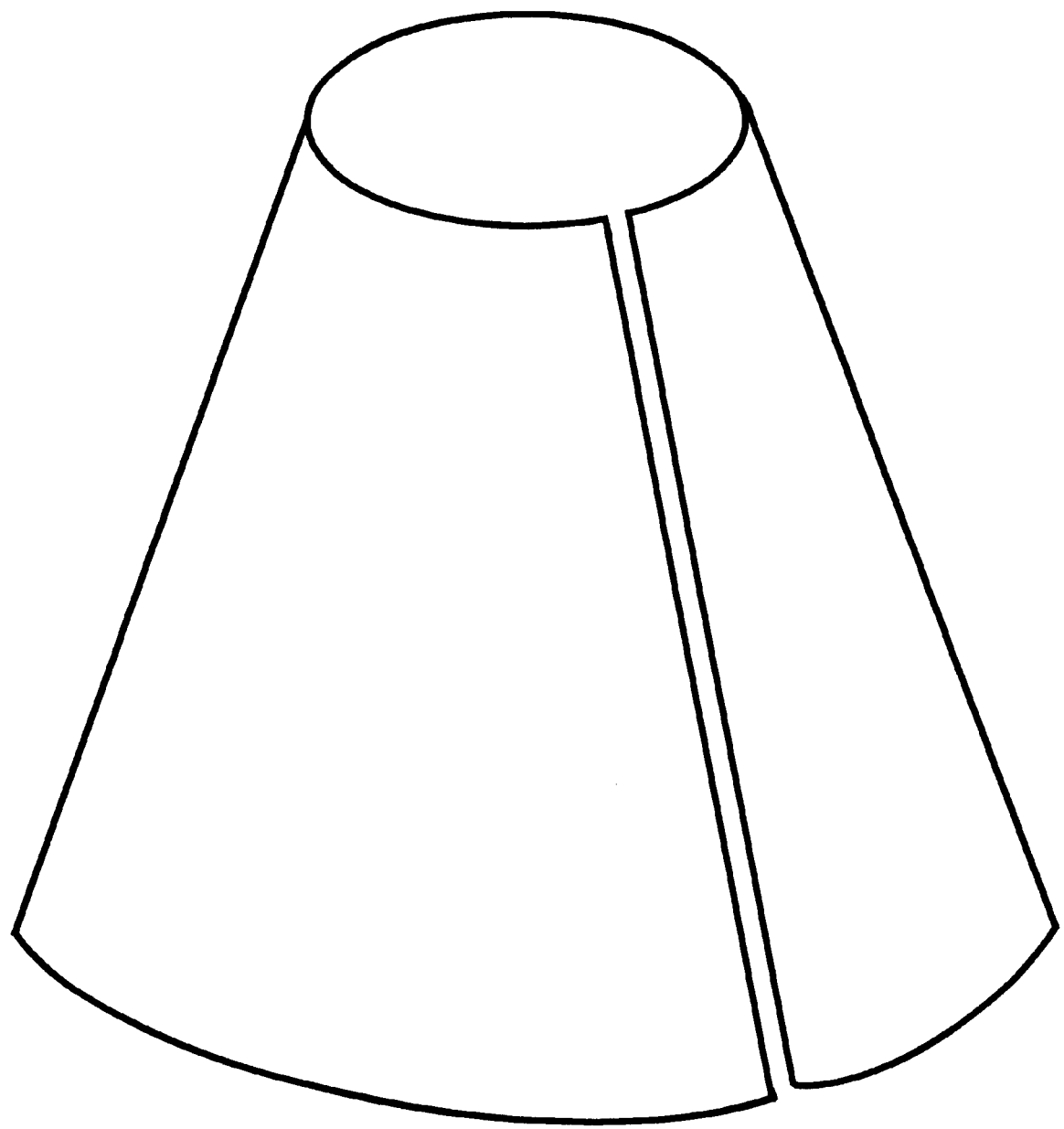
FIG. 3 is a perspective view of a conical housing.

Referring now to the figures of the drawings in detail and first, particularly, to FIG. 1 thereof, there is seen an illustration of the principle of the present invention in terms of an exhaust gas catalytic converter that includes a catalyst carrier 3. The catalyst carrier 3 is a honeycomb body that is made, for instance, from sheet metal layers and which is enclosed by an inner jacket or jacket tube 1. The inner jacket 1 protrudes at both ends beyond the metal catalyst carrier 3.

The inner jacket 1 is concentrically surrounded by an outer jacket or jacket tube 2. The outer jacket 2 has a length equivalent to that of the inner jacket 1. Outer end regions 4, 5 of the outer jacket 2 are deformed toward the inner jacket 1, they rest on the inner jacket 1 and they place the inner jacket 1 under compressive strain.

As can be seen from FIG. 1, in a later installed state the jackets 1, 2 are joined to one another and to an exhaust pipe 9 of an exhaust system. The connection is made by welding. A corresponding connection with a further exhaust pipe that would be disposed on the right-hand side of FIG. 1, is not shown.

An annular interstice 10 which is formed between the inner jacket 1 and the outer jacket 2 serves above all as thermal insulation. The outer jacket or jacket tube is provided with embossed features 11, which are preferably formed all the way around it and are distributed uniformly over the length of the housing. The embossed features 11 are oriented toward the inner jacket 1. In the illustrated exemplary embodiment, the embossed features 11 do not touch the inner jacket tube 1, so that no additional heat bridges are created between the inner and outer jackets. It is possible, if necessary, for the embossed features to be constructed in such a way that they touch the inner jacket 1. A mixture of nontouching and touching embossed features on the inner jacket tube is also possible. In addition, an insulation layer can be disposed in the interstice 10. The double-walled housing has great mechanical stability, because of its special construction. In particular, the embossed features 11 lend the housing great resistance to radial deformation, so that a housing, in which the wall thickness of the inner and outer jackets is approximately 0.5 mm each and in which the interstice is from 0.3 to 2 mm in size, attains the stability of a single-walled housing with a wall thickness of approximately 1.5 mm, yet weighs less and has better thermal insulation properties.

The housing shown in FIG. 1 can be produced as described below in conjunction with FIGS. 2a–2d. This is merely one exemplary embodiment. Other production processes are possible, and in particular, conical bodies which can be advantageous as an inlet or outlet cone of catalytic converters can be produced in a similar way, since they reduce heat losses in cold starting or restarting.

A substantially rectangular metal sheet is rolled to form the cylindrical jacket 2. Abutting edges of the jacket are welded together at reference numeral 13. A further metal sheet is substantially round-rolled to form the inner jacket 1. As can be seen from FIGS. 2a–2d, the inner jacket has a parting line 8 defined by opposed edges 6, 7.

The jackets 1, 2 which are produced in this way are thrust one inside the other, optionally with an insulating intermediate layer 12 shown in FIG. 1. Preferably, the inner jacket is disposed in such a way that the parting line is not located directly above the weld seam.

The jackets that are inserted one inside the other are then preferably deformed at their end region, so that the cross section of the housing is substantially equivalent to the outer cross section of a catalyst carrier. In the process the outer jacket 2 is plastically deformed with respect to the periphery, so that it touches the inner jacket 1 and keeps it under compressive strain, causing at least elastic deformation of the inner jacket. The embossed features 11 can be formed on the outer jacket 2 beforehand or simultaneously. As can be seen from FIGS. 1 and 2, the embossed features are preferably encompassing beads formed on the periphery of the jacket 2. These embossed features should be distributed approximately uniformly over the length of the housing. Encompassing beads lend the housing a certain lengthwise elasticity to compensate for thermal strains between the inner jacket 1 and the outer jacket 2, as in the case of a bellows. However, if such an effect is undesired, other types of embossed features may be provided that lend the outer jacket additional stability in all of the directions desired. The outer jacket 2 and inner jacket 1 may also be formed of different materials, such as ferrite and austenite in order to optimize the overall properties.

In order to exert purposeful influence on the heat conduction properties, the outside of the inner jacket 1 and/or the inside of the outer jacket 2 may additionally be provided with a coating, which reduces the heat transfer from radiation, that already plays an important role at the temperatures which occur in exhaust gas catalytic converters. Oxide films or heat reflecting layers are especially suitable for consideration in this respect.

The present invention is especially suitable for exhaust gas catalytic converters in motor vehicles that must meet especially stringent environmental protection regulations, since the lightoff performance in cold and warm starting can be improved.

I claim:

1. A double-walled housing, comprising:
   an inner jacket having two at least elastically deformed end regions; and
   an outer jacket approximately concentrically surrounding said inner jacket at a spacing, said outer jacket having constrictions at said two at least elastically deformed end regions tightly resting against said inner jacket and keeping said inner jacket under compressive strain at least at said two at least elastically deformed end regions, and said outer jacket having embossed features oriented toward said inner jacket; and
   said constrictions of said outer jacket and said two at least elastically deformed end regions of said inner jacket forming compression joint structures for securing said inner jacket in said outer jacket.

2. The double-walled housing according to claim 1, wherein said embossed features are formed all the way around in circumferential direction on said outer jacket.

3. The double-walled housing according to claim 2, wherein said embossed features are beads formed in said outer jacket.

4. The double-walled housing according to claim 1, wherein said embossed features do not touch said inner jacket.

5. The double-walled housing according to claim 1, wherein said embossed features at least partially touch said inner jacket.

6. The double-walled housing according to claim 1, including at least one thermally insulating layer or coating disposed between said outer jacket and said inner jacket.

7. The double-walled housing according to claim 6, wherein said thermally insulating coating is a heat-reflecting layer.

8. The double-walled housing according to claim 1, wherein said outer jacket is a rolled metal sheet having edges meeting one another and having a joining seam formed along said edges.

9. The double-walled housing according to claim 8, wherein said joining seam is a weld seam.

10. The double-walled housing according to claim 8, wherein said joining seam is a laser-weld seam.

11. The double-walled housing according to claim 1, wherein said inner jacket is a shaped metal sheet having edges with a parting line formed therebetween.

12. The double-walled housing according to claim 11, wherein said shaped metal sheet is a rolled metal sheet having one of a substantially circular, elliptical, and oval cross-section taken with respect to a longitudinal axis thereof.

13. The double-walled housing according to claim 11, wherein said shaped metal sheet is a rolled metal sheet having one of a substantially circular, elliptical, and oval cross-section taken with respect to a longitudinal axis thereof, the cross section having a cross-sectional area decreasing along the longitudinal axis.

14. The double-walled housing according to claim 1, wherein said inner jacket has edges defining a parting line and pressed against one another by said outer jacket.

15. The double-walled housing according to claim 1, wherein said inner jacket has a wall thickness of from 0.3 to 1 mm.

16. The double-walled housing according to claim 1, wherein said inner jacket has a wall thickness of approximately 0.5 mm.

17. The double-walled housing according to claim 1, wherein said outer jacket has a wall thickness of from 0.3 to 1 mm.

18. The double-walled housing according to claim 1, wherein said outer jacket has a wall thickness of approximately 0.5 mm.

19. The double-walled housing according to claim 1, wherein said inner jacket and said outer jacket have a maximum spacing therebetween of approximately 0.3 to 4 mm.

20. The double-walled housing according to claim 1, wherein said inner jacket and said outer jacket have a maximum spacing therebetween of approximately 0.5 to 1 mm.

21. The double-walled housing according to claim 1, wherein said embossed features are distributed approximately uniformly lengthwise over said outer jacket.

22. A catalytic converter, comprising:
   a double-walled housing having a cylindrical interior, an inner jacket having two at least elastically deformed end regions, and an outer jacket approximately concentrically surrounding said inner jacket at a spacing, said outer jacket having constrictions at said two at least elastically deformed end regions tightly resting against said inner jacket and keeping said inner jacket under compressive strain at least at said two at least elastically deformed end regions, and said outer jacket having embossed features oriented toward said inner jacket;
   said constrictions of said outer jacket and said two at least elastically deformed end regions of said inner jacket forming compression joint structures for securing said inner jacket in said outer jacket; and
   a catalyst carrier disposed in said cylindrical interior.

23. A catalytic converter, comprising:
   a double-walled housing having a conical interior, an inner jacket having two at least elastically deformed end regions, and an outer jacket approximately concentrically surrounding said inner jacket at a spacing, said outer jacket having constrictions at said two at least elastically deformed end regions tightly resting against said inner jacket and keeping said inner jacket under compressive strain at least at said two at least elastically deformed end regions, and said outer jacket having embossed features oriented toward said inner jacket;
   said constrictions of said outer jacket and said two at least elastically deformed end regions of said inner jacket forming compression joint structures for securing said inner jacket in said outer jacket; and
   a catalyst carrier disposed in said conical interior.

* * * * *